United States Patent
Luke et al.

(10) Patent No.: US 11,489,362 B1
(45) Date of Patent: Nov. 1, 2022

(54) UNINTERRUPTABLE POWER SUPPLY WITH SUPPLEMENTAL POWER APPORTIONMENT

(71) Applicant: Enconnex LLC, Reno, NV (US)

(72) Inventors: Benjamin Luke, Sparks, NV (US); Anthony Dela Cruz, Reno, NV (US)

(73) Assignee: ENCONNEX LLC, Reno, NV (US)

( * ) Notice: Subject to any disclaimer, the term of this patent is extended or adjusted under 35 U.S.C. 154(b) by 0 days.

(21) Appl. No.: 17/691,429

(22) Filed: Mar. 10, 2022

(51) Int. Cl.
*H02J 9/00* (2006.01)
*H02J 9/06* (2006.01)

(52) U.S. Cl.
CPC ............. *H02J 9/062* (2013.01); *H02J 9/068* (2020.01)

(58) Field of Classification Search
CPC .. H02J 9/061; H02J 9/062; H02J 9/068; H02J 9/00; H02J 3/06; G06F 1/28; G06F 1/30; G06F 1/263
See application file for complete search history.

(56) References Cited

U.S. PATENT DOCUMENTS

| | | | |
|---|---|---|---|
| 5,534,734 A | 7/1996 | Pugh et al. | |
| 5,781,448 A | 7/1998 | Nakamura et al. | |
| 6,917,124 B2 | 7/2005 | Shetler, Jr. et al. | |
| 10,148,123 B2 | 12/2018 | Budde | |
| 10,411,457 B2 | 9/2019 | Fischer et al. | |
| 10,429,914 B2 | 10/2019 | Shaikh et al. | |
| 2003/0048006 A1* | 3/2003 | Shelter, Jr. ............... | H02J 9/061 307/64 |
| 2011/0304211 A1* | 12/2011 | Peterson .................... | G06F 1/30 307/65 |
| 2012/0086276 A1* | 4/2012 | Sawyers .................... | H02J 1/12 307/66 |
| 2013/0117592 A1* | 5/2013 | Humphrey ............ | G06F 1/3203 713/320 |
| 2021/0135487 A1* | 5/2021 | Sok ......................... | H02J 9/062 |
| 2021/0242713 A1* | 8/2021 | Gonzalez ................ | H02J 9/062 |

FOREIGN PATENT DOCUMENTS

| | | |
|---|---|---|
| CN | 201535869 U | 7/2010 |
| CN | 211123742 U | 7/2020 |
| KR | 101078802 B1 | 11/2011 |
| KR | 101444266 B1 | 9/2014 |

* cited by examiner

*Primary Examiner* — Daniel Cavallari
*Assistant Examiner* — Rasem Mourad
(74) *Attorney, Agent, or Firm* — United IP Counselors, LLC (57) ABSTRACT

Uninterruptible power supplies (UPS) and control methods are disclosed. The UPS can deliver power from a first source, such as AC grid power, under normal operating conditions and a from second source, such as batteries, if power from the first source is unavailable or unsuitable. The UPS can also allocate power to and among various connected loads and can supply supplemental power to a load if that load has surpassed its regular power allocation. For example, when the power output or demand from the loads exceeds the available incoming power from the first power source, supplemental power may be supplied from the second source. Thus, the UPS can support temporary surges in power demand by apportioning power among loads and by temporarily engaging all available power sources, if needed.

18 Claims, 2 Drawing Sheets

UNINTERRUPTABLE POWER SUPPLY WITH SUPPLEMENTAL POWER APPORTIONMENT

TECHNICAL FIELD

The invention relates generally to uninterruptible power supplies, and more specifically to uninterruptible power supplies with power apportionment capabilities.

BACKGROUND

An uninterruptible power supply (UPS) is a device that is connected to both a main power supply and a backup power supply. The UPS uses those two power supplies to provide power to connected equipment. If the main power supply is interrupted or falters in some way, the UPS switches automatically from the main power supply to the backup power supply.

In most cases, the main power supply for a UPS is a high-voltage grid or building power, while the backup power supply comprises a battery or a set of batteries. In addition to supplying the connected equipment, the main power supply is usually used to charge the batteries of the backup power supply whenever possible. Most UPS units include extensive circuitry to convert the low-voltage, direct current (DC) power supplied by the batteries to high-voltage, alternating current (AC) power. Some UPS units use an internal DC power bus and convert all incoming AC power to DC, reconverting the DC power of the bus to AC power suitable for delivery to the connected equipment.

Even as UPSes grow more sophisticated in their configurations and capabilities, most UPS units simply attempt to supply whatever power their connected pieces of equipment require. Yet equipment has also grown more sophisticated—and more variable in power demands. The power demands of a piece of equipment in a data center may vary considerably over time, and for reasons of conservation, efficiency, and scale, it may not be practical to use a large UPS with a huge bank of batteries that can supply the maximum power demand of all its connected equipment indefinitely.

BRIEF SUMMARY

One aspect of the invention relates to an uninterruptable power supply (UPS). The UPS is connected to two separate power sources, usually a primary AC power source and a secondary stored power source, such as a battery or batteries. Using these two power sources, the UPS can provide power from the AC power source under normal operating conditions and traditional backup power from the secondary power source if the primary power source fails or is otherwise unavailable. However, a UPS according to this aspect of the invention has a third operating state: if the power demand from a load exceeds the input power available, the UPS can supply supplemental power from the secondary stored power source simultaneously with the power from the primary AC power source to provide the necessary power. In most cases, there are limits to the provision of such power; for example, supplemental power may be provided until a load has used a preprogrammed amount of energy, or until supplemental power has been provided for a preprogrammed amount of time. When the allocated amount of supplemental power has been exhausted, the load or loads may be shut down, or some other preprogrammed action may be taken.

Another aspect of the invention relates to a method for providing and allocating supplemental power using a UPS or similar power supply such as that described above. This method toggles the UPS between three states: a first state, in which the UPS is providing power to the load or loads via the AC power source; a second state, in which the UPS is providing power to the load or loads via the secondary source; and a third state, in which the UPS is providing supplemental power using both the AC power source and the secondary source simultaneously. In placing the UPS into the third state, the method may consider whether the output power demand exceeds a limit placed on the input power, as well as other factors. For example, the method may allow the use of supplemental power only during specific, high-demand periods of time during the day. In some cases, the method may allow the use of supplemental power only in certain circumstances. For example, the method may place the UPS in the third state and allow supplemental power use only if sufficient power remains in the secondary power source, considering the potential need to provide backup power if the primary AC power source fails. This method may also monitor for and declare system faults, using a bypass switch to bypass the UPS's internal circuitry or bus to deliver power directly from the AC power source if needed; determine when and how to charge the secondary power source; and monitor for overloads. Finally, if a load has exceeded the allocated or available supplemental power in the third state, the method may open an output relay or a similar such device to cut power to that load.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
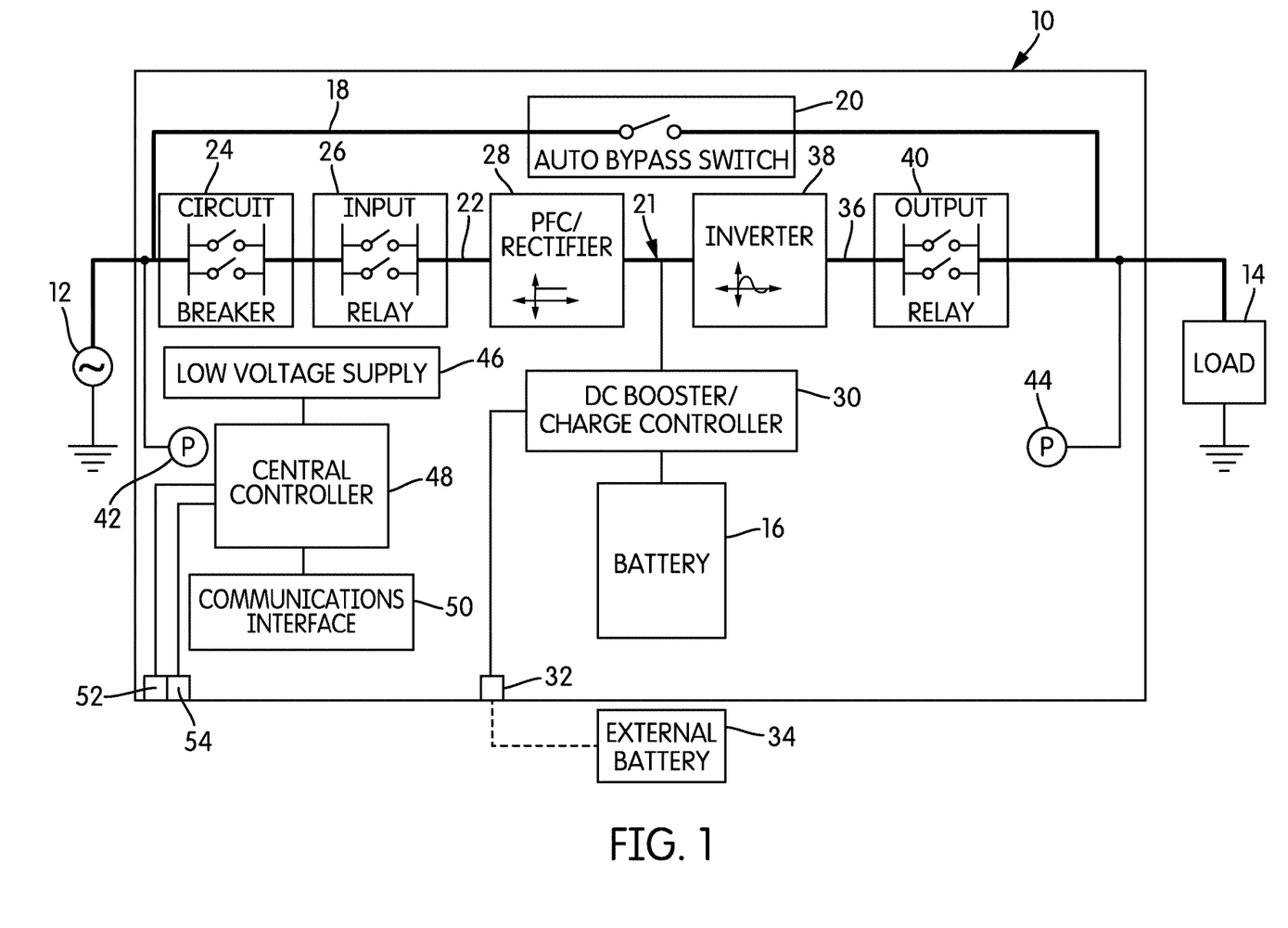
FIG. 1 is a schematic illustration of an uninterruptible power supply (UPS) according to one embodiment of the invention.

FIG. 1 is a schematic illustration of an uninterruptible power supply (UPS), generally indicated at 10, according to one embodiment of the invention. The UPS 10 receives power from a high-voltage alternating current (AC) source 12 and provides power to an electrical load 14. For purposes of this description, the AC source 12 may be a single-phase source or a three-phase source that operates at conventional commercial voltages, e.g., 120-240 VAC at 60 Hz for a single-phase source and 208-240 VAC at 60 Hz for a three-phase source. The operating voltages may be higher or lower, and the power frequency may also vary. In this description, the AC source 12 is the power source from which the UPS 10 customarily receives power much of the time. In many cases, the AC source 12 will be, or will be connected to, a terrestrial power grid. However, the AC source 12 could be an engine, a generator, a wind power source, a solar power source, etc. The AC source 12 may or may not be specially filtered or otherwise conditioned for use with the UPS 10.

The electrical load 14 depicted in FIG. 1 may be any component or components that receive power from or through the UPS 10. In this description, the load 14 will often be a computing component or components, although other types of loads may be powered by the UPS 10, e.g., lighting equipment, industrial machinery, etc. Although a single load 14 is shown in FIG. 1, the UPS 10 could service multiple loads 14 simultaneously, each connected to its own power output. This description may refer to a group or number of machines powered by the UPS 10 in the singular as "a load," or it may differentiate between machines powered by the UPS 10, referring to "loads" in the plural if, for example, the needs, ownership, or other characteristics of the individual machines are relevant in context.

The UPS 10 is capable of performing the functions of a typical UPS, i.e., it can provide power directly or indirectly from the AC source 12, or it can provide power from batteries 16 if the AC source 12 is unavailable or its output is not suitable for the load 14. In some embodiments, regardless of its operating mode, the UPS 10 will provide AC power that has been filtered or otherwise conditioned, such that the AC source 12 is not connected directly to the load 14 except in cases of a system fault. For example, AC power from the AC source 12 may be converted to DC power and then re-converted from DC to AC.

As will be described below in more detail, in addition to standard UPS functions, the UPS 10 can also provide programmable amounts of supplemental power during circumstances in which a load 14 is drawing more power than usual or expected and the input power from the AC source 12 cannot completely address the power demand. In particularly advantageous embodiments, the UPS 10 is capable of apportioning this supplemental power according to pre-defined or programmed limits, so that a load 14 cannot draw supplemental power indefinitely.

Internally, three separate power pathways are connected between the AC source 12 and the load 14. The first of these is a bypass pathway 18 that includes a bypass switch 20. The bypass pathway 18 extends from the AC source 12 and the load 14, interrupted by the bypass switch 20. The bypass switch 20, which actuates automatically in circumstances that will be described in greater detail below, allows power to flow directly from the AC source 12 to the load 14 when it is closed. Although this pathway can be used to in a variety of circumstances, in many working embodiments, the bypass pathway 18 exists merely so that the UPS 10 can continue supplying power if a system fault prevents use of the batteries 16 or other internal components, so that power cannot be supplied by the UPS 10 in a normal manner.

Aside from the bypass pathway 18 and its bypass switch 20, the UPS 10 of the illustrated embodiment does not generally operate as a mere switching apparatus. Rather, incoming power is conditioned and maintained at appropriate levels in a suitable condition. To accomplish this, the UPS 10 includes an internal power bus 21. The purpose of the bus is to provide power in a standardized, specified condition for all regular power-delivery operations of the UPS 10, whether those operations use the AC power source 12 or the batteries 16. In normal operating conditions, that is, conditions in which the bypass switch 20 is not closed, all power that enters or leaves the UPS 10 transits the internal power bus, is raised to the bus voltage, and is otherwise conditioned to the standard of the bus. For example, a boost converter or similar elements may be provided to raise the input voltage to the bus voltage, or a buck converter or similar elements may be provided to lower the input voltage to the bus voltage if the input voltage is too high. As will be described in more detail below, the power bus 21 operates using DC voltages. Thus, all power that enters as AC power is converted to DC, and all power exiting the UPS 10 to be supplied to the loads 14 is converted from the DC voltage of the power bus 21 to an AC voltage.

Above, it was noted that the UPS 10 has three power pathways, of which the bypass pathway 18 is one. The second power pathway 22 and the third power pathway 36 are normal power delivery pathways, used in normal or typical operating conditions. Thus, both power pathways 22, 36 use the internal power bus 21.

The second power pathway 22 takes power from the AC input 12 and conditions that incoming power for the internal power bus 21. Specifically, this pathway 22 is protected by an input circuit breaker 24 to avoid overload conditions, as well as an input relay 26 that allows voluntary disconnection of the bus 21 and the second pathway 22 on the input side. A power factor control and rectifier 28 receives the AC source power, rectifies it and corrects the power factor. Thus, by the time that the incoming power has reached the internal power bus 21, it meets the power specifications of the bus 21. For example, the bus 21 may operate at 400 VDC.

The internal power bus 21 is connected to and feeds a DC booster and charge controller 30, which forms the interface to the batteries 16. The purpose of the DC booster and charge controller 30 is to ensure that the batteries 16 are charged appropriately, and to ensure that when power is drawn from the batteries 16, that power is properly converted to the power specifications of the internal power bus 21.

For example, the DC booster/charge controller 30 may be responsible for stepping the bus voltage down to a voltage that is suitable for charging. As those of skill in the art will appreciate, the bus voltage may be too high to charge the batteries 16 appropriately. For that reason, the charge controller 30 may include a buck converter or other, similar circuit architecture to step down the input voltage to a voltage appropriate for battery charging. Typically, the batteries 16 will operate at low voltage which, for purposes of this description, refers to voltages under 160V.

The batteries 16 themselves may be any sort of rechargeable chemical cell that can store energy. Lead-acid batteries have traditionally been used in these applications, although lead-acid batteries are beginning to be supplanted by lithium-ion batteries. Either may be used in embodiments of the invention. The charge controller 30 charges the batteries 16 at a rate and in a way that is appropriate for the batteries 16 and their chemistry or other characteristics. For example, the charge controller 16 may limit charging to a particular rate, maintain a trickle charge on the batteries when they are charged, or take other such actions necessary or desirable to keep the batteries 16 in good condition.

The UPS 10 has a port or input 32 that allows it to be connected to one or more external battery packs 34. External battery packs 34 are optional but may be used to increase the amount of power or the amount of surge or supplemental power that can be supplied by the UPS 10. The input 32 for the external battery packs 34 is connected internally to the DC booster and charge converter 30, such that the DC booster and charge converter 30 controls whether the internal batteries 16, the external battery packs 34, or both are being charged and/or supplying power.

The third power pathway 36 is the pathway by which power is discharged from the internal batteries 16 or external battery packs 34 into the load, using the internal bus 21. Power from the internal power bus 21 is directed through an inverter 38 to produce AC power. The output of the third power pathway 36 (i.e., the battery discharge pathway) is protected by an output relay 40, which can connect or sever the connection between the internal bus 21 and the load 14. If it is necessary to supply power from the batteries 16, that power flows through the DC booster and charge converter 30 onto the internal power bus 21, where the power is drawn out to the load 14 through the third power pathway 36.

With the internal power bus 21 and the second and third power pathways 22, 36, when the UPS 10 is in normal operating conditions, it can supply power from the batteries 16 or from the AC source 12 without a lag time caused by physically switching between the two sources. The internal power bus 21 is simply kept at its operating power and voltage conditions and power is drawn from whichever sources are needed to maintain it. Additionally, all power from the AC source 12 is put through an AC-DC-AC conversion before being delivered to a load 14.

In addition to the three power pathways 18, 22, 36, the UPS 10 includes measuring, control, and interface components. Specifically, the UPS 10 measures (or measures components of and calculates) at least input power and output power, and may measure or calculate voltage, current, and power draw at various other points within the pathways 18, 22, 36 or along the internal bus 21. As shown in FIG. 1, power measurement devices 42, 44 are positioned to take measurements near the input and near the output of the UPS 10. This is a simplified depiction; most embodiments would use both a voltmeter and an ammeter, although those two devices may be combined into a single package or device in some cases.

Internally, the UPS 10 also includes a low-voltage, internal-circuit power supply 46, which supplies power for the internal electronics. The low-voltage power supply 46 may supply any voltage suitable for electronics, e.g., 5V, 3.3V, 1.8V, etc. In some cases, the low-voltage power supply 46 may supply several discrete voltages, e.g., 5V, 3.3V, and 1.8V simultaneously. For simplicity in illustration, the connections of the low-voltage power supply 46 are not shown; the low-voltage power supply would generally be connected to the internal bus 21. If necessary, the low-voltage power supply 46 may be connected to both the internal bus 21 and, directly or indirectly, to the AC source 12, so that the low-voltage power supply 46 can draw power regardless of the operating mode of the UPS 10; however, in some circuit topologies, the bus 21 itself may be arranged such that it is connected to power regardless of the operating mode. In some cases, the low-voltage power supply 46 may receive power indirectly through another component, such as the DC booster/charge controller 30 that already operates at low voltage.

Among other components, the low-voltage power supply 46 supplies power to a central controller 48 that controls the functions of the UPS 10. The central controller 48 may be an application-specific integrated circuit (ASIC), a field-programmable gate array (FPGA), a microcontroller, or a microprocessor, to name a few possibilities. In some cases, the central controller 48 may be a system-on-a-chip that includes the microcontroller, microprocessor, or other logic unit, along with memory and other components. Whether or not the central controller 48 is integrated with other components or not, other components, like memory, would generally be included and are not shown in FIG. 1 for the sake of simplicity. In general, the central controller 48 may be any integrated circuit or other computing element capable of performing the tasks ascribed to it in this description.

The UPS 10 also includes a communications interface 50. The term "communications interface" is a general one that refers to all types of input and output that may be necessary to or desirable for the operation of the UPS 10. This may include physical or virtual buttons, a display, a touch-sensitive display, and other such elements used to gather input from a user. The communications interface 50 may also include local-area and wide-area network interfaces, such as an Ethernet interface, and wireless interfaces, such as a WiFi transponder chipset. The wired and wireless communication interfaces may be used to provide alerts to the system operator of the state of the UPS 10, as well as alerts when the amount of supplemental power that is provided exceeds predefined caps, as will be explained below in more detail. The communications interface 50 may also enable remote control over the UPS 10. It should be understood that while the communications interface 50 may include various capabilities, including wired and wireless connectivity, the functions that are actually used may depend on how and where the UPS 10 is installed. For example, the operator of a large-scale data center may not wish to enable wireless connectivity, and may wish to limit wired (e.g., Ethernet) connectivity to an in-house LAN in order to prevent cyberattacks on infrastructure.

The UPS 10 also includes a remote power off (RPO) interface 52, allowing the UPS 10 to shut off power to connected equipment, and a remote on-off interface 54, allowing the UPS 10 itself to be turned on and off remotely. These two interfaces 52, 54 are connected either to the central controller 48, as shown in FIG. 1, or to the communications interface 50.

Although one central controller 48 is shown, the UPS 10 may actually contain multiple logic elements such as microcontrollers or microprocessors. For example, there may be a separate microcontroller or microprocessor controlling battery charge, a separate microcontroller or microprocessor that drives a display within the communications interface 50, etc. As those of skill in the art will understand, for reasons of power conservation, it may be helpful to use the least computing power that can perform the necessary functions.

Physically, the UPS 10 may have any convenient form. Typically, the components would be placed in an enclosure. In at least some embodiments, the UPS 10 may be in the form of a rack-mount component with standard dimensions and height for mounting in a standard telecommunications/information technology equipment rack or cabinet.

Figure 2:
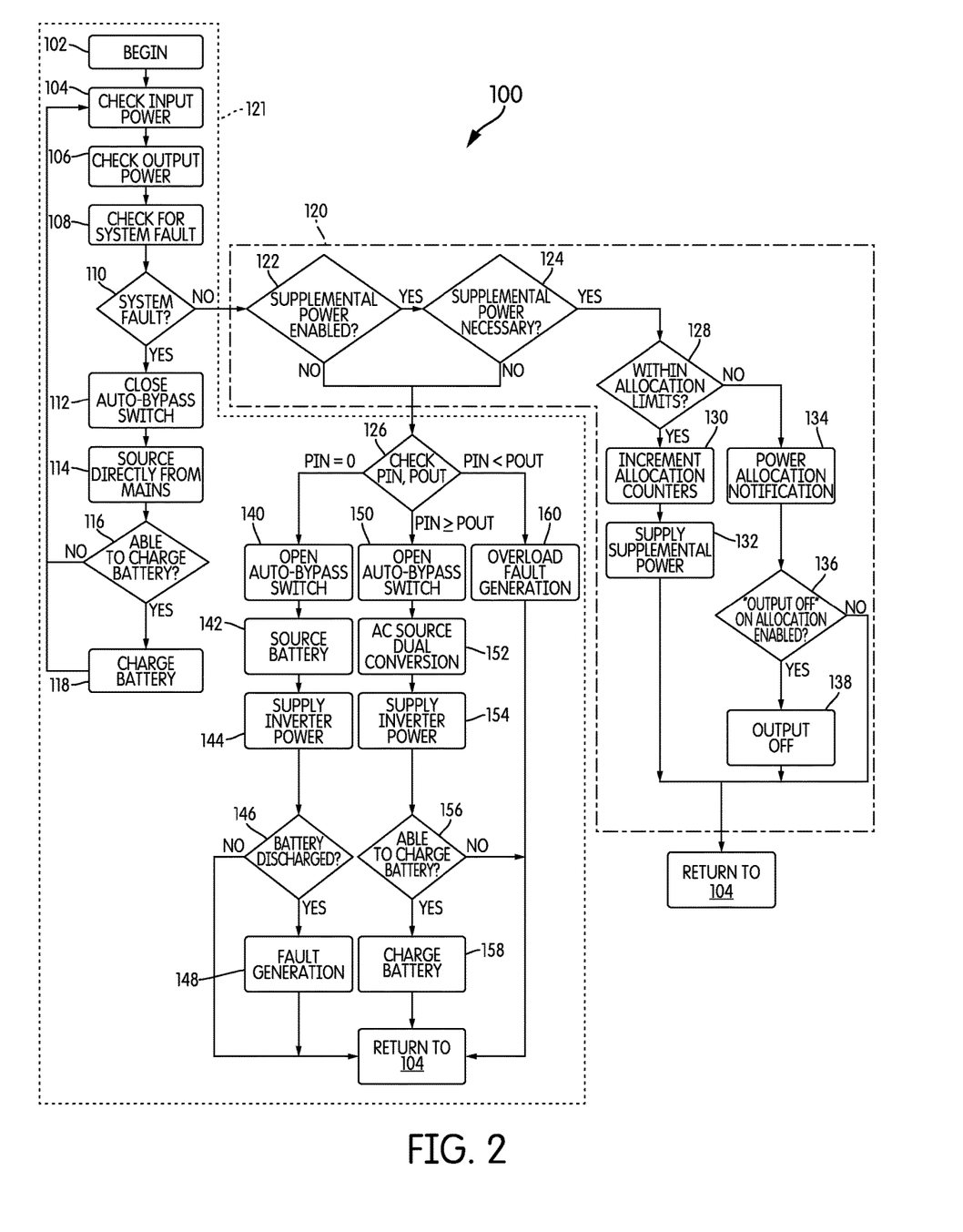
FIG. 2 is a flow diagram of a method of controlling the UPS of FIG. 1, or a similar power supply, to deliver and allocate supplemental power according to another embodiment of the invention.

FIG. 2 is a flow diagram of a method, generally indicated at 100, for controlling a device like the UPS 10 to deliver supplemental power to meet unexpected and temporary power needs while also providing backup power when mains power is unavailable. While some parts of this description may refer specifically to the UPS 10 and its components, method 100 need not necessarily be performed on or using the UPS 10 as shown in FIG. 1. Any power supply that can be configured to provide mains power in normal circumstances, backup battery power when mains power is unavailable, and supplemental power when needed may be used to execute method 100.

Method 100 begins at task 102. When method 100 begins, it is assumed that the UPS 10 is on and at steady state with input and output relays 26, 40 closed and bypass switch 20 open. Prior to the execution of method 100, various power-on self-test and diagnostic routines may be run, the batteries 16 and charge controller 30 may be tested, etc. Method 100 continues with task 104, followed by task 106. In tasks 104 and 106, the UPS 10 checks the input power and output power, respectively. That is, the UPS 10 checks the power that is being drawn from the AC source 12 and the power demand of the loads 14. These two tasks 104, 106 may be performed essentially simultaneously. Method 100 continues with task 108.

In task 108, the UPS 10 checks for a system fault. The determination that a system fault exists may be based on the power measurements in tasks 104 and 106, as well as any other diagnostics or internal sensor readings that the UPS 10 may perform or take, or any other software alerts or exceptions that may be thrown. For example, the charge controller 30 may measure the condition of the batteries 16, and if the batteries 16 are in poor condition, e.g., they will not hold a charge, the charge controller 30 may report that fact, and a system fault may be declared on that basis. As another example, the tripping of the internal circuit breaker 24 could be reported as a fault in task 108. Method 100 continues with task 110, a decision task.

In task 110, if there is a system fault (task 110: YES), method 100 continues with task 112. Although there are many possible types of system faults, with respect to tasks 108 and 110, the main type of system fault that is of concern is a fault in which the batteries 16 are unavailable. This may be because of the condition of the batteries 16 themselves, because of a fault in the charge controller 30, or because of a fault somewhere else in the UPS 10. In task 112, the auto-bypass switch 20 is closed, the output relay 40 is opened, and the input relay 26 may be opened in some cases as well. In task 114, the UPS 10 supplies power solely from the AC source 12, with no battery power available. Other methods and processes may be triggered to try to remedy the detected fault; method 100 determines only the way in which the power is delivered in the case of a fault.

However, the fact that this kind of system fault exists does not necessarily mean that the rest of UPS 10 is completely inoperative. Thus, method 100 continues with task 116, another decision task, in which the UPS 10 assesses whether it is possible to charge the batteries 16. This may involve several individual inquiries, although task 116 is shown as one decision task for convenience in explanation.

For example, in an operational embodiment, it is possible to charge the batteries 16 if the batteries 16 are not themselves in a fault status, if the batteries 16 are not at 100% charge, if there is sufficient input power remaining to do so, and in some cases, if there is sufficient input power leaving a reserve of input power for programmable supplemental power allocation to the loads 14, as will be described below in more detail. In order for it to be decided in task 116 that the batteries 16 can be charged, all of the above conditions may need to be true. Ultimately, if it is possible to charge the batteries (task 116: YES), method 100 continues with task 118 and the batteries 16 are charged. Control of method 100 then returns to task 104.

In task 110, if there is no system fault (task 110: NO), method 100 continues with a programmable supplemental power algorithm. For ease of understanding, the main tasks specific to the programmable supplemental power algorithm are indicated collectively at 120 in FIG. 2, whereas tasks of method 100 that are typically performed regardless of whether or not the programmable supplemental power algorithm 120 is enabled or disabled are indicated collectively at 121 in FIG. 2.

This description assumes that the programmable supplemental power algorithm can be enabled or disabled in part because, in many cases, the programmable supplemental power algorithm 120 will be an optional feature. A manufacturer might not include the programmable supplemental power algorithm 120 in the firmware or software of every UPS or other power supply that is capable of implementing it. The manufacturer, an equipment installer, or the end user may add or enable the programmable supplemental power algorithm 120 after manufacture, e.g., by firmware or software update in the field.

Yet even if the programmable supplemental power algorithm 120 is installed and available, method 100 provides the end user, i.e., the entity with operational control over the UPS, the ability to dictate when and under what conditions it is used. Specifically, the programmable supplemental power algorithm 120 can be enabled or disabled for any particular iteration of method 100. With respect to FIG. 2, if there is no system fault in task 110, method 100 continues with task 122, a decision task. In task 122, method 100 checks to see whether programmable supplemental power allocation has been enabled. If so (task 122: YES), method 100 continues with task 124, another decision task. If programmable supplemental power allocation has not been enabled, control of method 100 passes to task 126, a decision task that determines the operating state of the UPS when supplemental power is not being used.

In task 124, having checked that programmable supplemental power allocation is enabled, method 100 checks to see whether supplemental power allocation is actually necessary at the present moment. In the flow diagram of FIG. 2, this is shown as a single decision task: if supplemental power allocation is not necessary (task 124: NO), method 100 continues with task 126 to determine its operating state; if supplemental power allocation is necessary (task 124: YES), method 100 continues with task 128 and the process of allocating or apportioning the supplemental power according to defined, programmable limits begins.

In actual embodiments, task 124, the process of determining whether supplemental power allocation is necessary, may comprise any number of sub-tasks. For example, in one embodiment, task 124 may involve resolving a single question: whether the output power to the loads 14 is greater than the limit established for input power. If so, supplemental power is necessary. Note that in this embodiment, this decision is based, in part, on a comparison with a programmable input power limit—the maximum amount of power that should be drawn from the AC source 12, rather than the amount of power that can be drawn from the AC source 12. Such programmable input power limits, which are usually deeply intertwined with safety concerns, will be discussed below in more detail.

Other decisions and questions may enter into task 124. For example, in another embodiment, it may be desirable to provide supplemental power only during certain high-demand periods of the day. In this embodiment, task 124 might comprise comparing the output power and the input power vs. input power limit as described above but would then involve a second decision—whether or not the current time is within the time period during which supplemental power is offered. In this scenario, supplemental power would be deemed necessary for purposes of task 124 only if the answer to both of those questions is yes, i.e., the demand for power is greater than the limit of what can be drawn from the AC source 12 and the current time is within the window of time during which supplemental power is to be offered.

As was alluded to above, in general, method 100 does not simply provide supplemental power without limit. Rather, supplemental power is usually allocated or apportioned according to pre-defined limits. Those limits are typically programmable. Task 128, a decision task, begins the process of implementing those limits. If a particular load 14 or group of loads 14 is within its programmable supplemental power allocation limits (task 128: YES), method 100 continues with task 130 and a power allocation counter is incremented before supplemental power is delivered in task 132. During power delivery in task 132, method 100 may also detect overload conditions, and may generate a fault if one occurs. Once power delivery has begun, control of method 100 passes out of the programmable supplemental power algorithm 120, into standard UPS operations at task 104.

In task 128, if the load 14 or group of loads 14 is not within its allocation limits (task 128: NO), that load 14 or group of loads 14 has used up all of its allocated supplemental power. Thus, some corrective action must be taken. The particular corrective action that is taken will vary from embodiment to embodiment, and may comprise a warning message or warning messages, or a frank shutdown of the loads 14 involved. In most cases, the corrective action will be programmable, and may vary from load 14 to load 14, or from one group of loads 14 to another. In the particular embodiment illustrated in FIG. 2, the process begins with a notification in task 134 that the allocated or apportioned supplemental power has been consumed. Method 100 then continues with task 136, a decision task. If method 100 has been programmed to shut down a load 14 when its supplemental power allocation has been reached or exceeded (task 136: YES), that is done in task 138, e.g., by opening the output relay 40 that leads to the particular load 14. If not (task 136: NO), control of method 100 passes out of the programmable supplemental power algorithm 120 and returns to task 104.

The programmable supplemental power algorithm 120 complements typical UPS operations. As was noted briefly above, in method 100, typical or standard UPS operations begin with task 126, a decision task. Fundamentally, a UPS 10 in a standard operating mode chooses its power source based on a check of input and output power.

If there is no input power from the AC power source 12 (task 126: $P_{in}=0$), the UPS 10 supplies power exclusively through the batteries 16. In this case, the auto-bypass switch is opened in task 140; the batteries 16 are selected as the power source in task 142, and power is supplied from the batteries 16 through the DC booster and charge controller 30 and the inverter 38. Task 146, another decision task, detects whether the batteries 16 have been discharged. If the batteries have been discharged (task 146: YES) a system fault is generated in task 148 before method 100 returns to task 104.

Of course, there may be situations in which there is some form of power coming from the AC power source 12, but the power may not be suitable for the loads 14. For example, it may be too variable in voltage, or contain too much noise. In some cases, the onboard power conversion components, such as the PFC/Rectifier 28 and the inverter 38, may be able to condition that power or otherwise render it useable. However, if that is not possible, if the incoming power cannot be conditioned or otherwise rendered useable, method 100 may proceed as if the available power is nil. For that reason, phrases such as "no input power" should be read broadly to encompass situations in which the amount of useable power is nil.

Another normal operating condition occurs when the input power is greater than or equal to the output power to the loads (task 126: $P_{in} \geq P_{out}$). In this scenario, sufficient power from the AC source 12 exists to meet the needs of the loads 14. Thus, the auto-bypass switch 20 is opened in task 150, if it had previously been closed. Method 100 then selects the AC source 12 as the source in task 152. However, as also indicated in task 152, and as was described above, the incoming AC power undergoes a dual conversion. First, the incoming AC power from the AC source is converted to DC power at the voltage of the internal power bus 21, and then, as indicated in task 154, DC power at the voltage of the internal power bus 21 is converted back to AC power at a voltage and frequency suitable for the loads 14. In other words, the inverter 38 and associated components can be set to produce whatever type of power is needed by the loads 14. This may be, e.g., single-phase power or three-phase power at any needed voltage and frequency.

At some interval after task 154, control of method 100 passes to task 156, a decision task. Like in task 116, described above, in task 156, if it is possible to charge the batteries 16, that is done in task 158 before method 100 returns to task 104 and continues.

As can also be seen in the illustration of FIG. 2, control of method 100 passes from either of task 132 or task 138 to task 104.

Method 100 of FIG. 2 contemplates one further scenario as a result of the input and output power checks performed in task 126: a case in which the input power from the AC source 12 is less than what is required by the loads 14. If method 100 were executing the programmable supplemental power allocation algorithm 120, a lack of sufficient input power to meet output power demand could be addressed by deploying supplemental power, at least for a short time. However, if method 100 reaches task 126, it has already been decided that the use of supplemental power is either disabled (task 122) or unnecessary (task 124). Thus, the only thing left to do in this scenario (task 126: $P_{in}<P_{out}$) is to declare an overload fault in task 160 and return control of method 100 to task 104.

If supplemental power is enabled, the condition that $P_{in}<P_{out}$, and the need to declare a fault at task 160, should be relatively rare. Moreover, as was noted above with respect to task 124, the UPS 10 and method 100 will usually deal with, and make decisions based on, programmed limits to the input power, i.e., programmed limits to how much power can actually be drawn from the AC input 12. For example, in many embodiments and operating modes, comparisons will actually be done based on the actual input power versus a programmed input power limit, as is the case in task 124, when it is decided whether or not supplemental power is necessary. Thus, this branch of method 100 and task 160 are primarily present in case supplemental power is not enabled or available, and as a safety failsafe, in case there is a problem with the programmed input power limits. In general, it is beneficial to include such failsafes, i.e., systems and method steps that prevent overloads and the potential safety hazards that they bring with them.

So long as the UPS 10 is running, method 100 would not typically terminate. Rather, as can be seen in FIG. 2, method 100 returns to its beginning once a particular decision pathway has been completed.

EXAMPLES

The Examples below illustrate various ways in which method 100 and its variants may be implemented. As was described briefly above, these Examples use parameters to define how much regular and supplemental power are allocated to each load, rather than referring to simple comparisons of input and output power. Parameters are also used to define the behaviors that occur when allocations are exceeded. The relevant parameters for one particular embodiment of the invention are set forth in Table 1 below.

TABLE 1

Parameters for Management of Supplemental Power.

| Parameter Name | Units | Explanation |
|---|---|---|
| Manual and Adjustable Parameters | | |
| Expected Power | Watts | Expected normal equipment operating power |
| Max Allowed Input Power | Current or Watts | Defined power limit available to a particular load or group of loads |
| Max Supplemental Power | Watts | Supplemental power threshold above which power will be cut off to the load or group of loads |
| Max Supplemental Energy from Battery | Watt-hours or kilowatt-hours | The maximum amount of battery energy permitted to be used for supplemental power, in order to reserve power for power loss operations |
| Max Supplemental Time | Seconds/ Minutes | Parameter allowing max supplemental energy from battery to be expressed as a function of time. |
| Max Excess Charging Power | Watts | Charging energy allowed in excess of Max Allowed Input Power. Determines charging time. |
| Allow Excess Charging for Banking Power | Boolean | Should excess power be used to charge the battery? |
| Max Supplemental Power Operation | Boolean/ State Variable | Defines what to do if the Max Supplement Time is exceeded (e.g., power down) |
| Restart Operation | State Variable | Controls when power is reapplied to a particular load or group of loads after power-down (e.g., when batteries full, when batteries are at x%, after firmware "on" command, or after hardware "on" command) |
| Hardware-Dictated Parameters | | |
| Max Inverter Power | Watt-hours | Maximum power that can be supplied by the inverter |
| Battery Energy Capacity | Watt-hours | Amount of energy that the installed batteries can store |
| Max Total Output Power | Watts or Amps | The total current or power that can be output (determined, in part, by wire/connector ampacity) |
| Max Total Input Power | Watts or Amps | The total current or power that can be input to the UPS (determined, in part, by wire/connector ampacity) |

The following examples use the parameters of Table 1 as practical examples of power and supplemental power allocation. Many of these examples assume the context of a shared data center, where multiple customers, contract with a data center operator for power and other services. The shared data center is one context in which systems and methods according to embodiments of the invention are particularly useful.

Example 1

A customer expects to use 1500 W of power, but expects that eventually, they may add equipment requiring up to 3000 W of power. If this customer exceeds 4500 W, its equipment will be shut down.

The data center operator creates an agreement allowing up to 3000 W of continuous power. If the customer exceeds 3000 W of load output power, it can use banked energy up to the 4500 W maximum defined by the data center operator. In this scenario, the customer can bank (i.e., have allocated to them) up to 500 Wh of battery energy. Additionally, 300-500 Wh of energy will be banked in case of power outage. These energy storage levels will depend on battery health. If the batteries 16 are expended, the output power for the data center will be turned off, and the data center operator will need to turn the power back on again. Thus, the parameters of Table 1 are defined as follows:

Expected Power=1500 W (at 208V, 7.2 A)
Max Allowed Input Power=3000 W (at 208V, 14.4 A)
Max Supplemental Power=4500 W (at 208V, 21.6 A)
Max Supplemental Energy from Battery=500 Wh
Max Supplemental Time=25 minutes
Max Excess Charging Power=0 W
Allow Excess Charging for Banking Power=No
Max Supplemental Power Operation=Power Down
Restart Operation="On" Firmware As may be apparent from the above, in Example 1, supplemental power may not be supplied for a long, sustained period. In the above, the maximum time that supplemental power can be used is 25 minutes. Supplemental power may be best used for transitory surges in need for power, with battery charging occurring at other times.

Example 2

A customer in a shared data center has equipment that is expected to use no more than 300 W of continuous power. However, the customer has equipment that uses much more power for brief periods of time. For example, once a day, the customer transmits with a piece of equipment that uses 2000 W for 20 minutes.

In this case, the customer wants to use no more than 500 W continuous power from the power grid (i.e., AC power input to the UPS 10). If the load exceeds 500 W, the customer will use its banked energy at up to 3500 W max. They want to bank (i.e., have a supplemental power allocation of) up to 800 Wh of battery energy (1500 W for 20 min=450 Wh typically used). Additionally, 0-200 Wh of energy will be banked in case of power outage (based on battery health). If the batteries are expended the output will be turned off and will be turned back on when the battery has recharged. The parameter settings are:

Expected Power=300 W (at 208V, 1.4 A)
Max Allowed Input Power=500 W (at 208V, 2.4 A)
Max Supplemental Power=3500 W (at 208V, 16.8 A)
Max Supplemental Energy from Battery=800 Wh
Max Supplemental Time=Max Energy (i.e., not time-measured)
Max Excess Charging Power=0 W
Allow excess Charging for Banking Power=No
Max Supplemental Power Operation=Power Down
Restart Operation=Bank Full As those of skill in the art will understand, the above are prospective or prophetic examples; many other scenarios are possible and can be implemented, based on the parameters set forth above, or on other parameters.

While the above are examples of apportioning or allocating power to a single load or group of loads, in some cases, the power needs and demands of other loads may be considered when setting the power allocation for a particular load. In other words, the allocation limits for any one load may take into account the state of the UPS 10 and the needs of other loads connected to it.

Physically, the UPS 10 may be in the form of a rack-mount device with standard dimensions for mounting on a rack. When rack-mounted, the UPS 10 may provide power for the loads on that particular rack. If external battery packs 34 are provided, they may be mounted on the same rack, or they may be mounted elsewhere and connected to the UPS 10 with cables. Method 100, and other methods for controlling a UPS 10 may be stored as sets of machine-readable instructions on a machine-readable medium on the UPS 10, retrieved, and executed as needed. For example, the instructions for executing methods such as method 100 may be stored in firmware or in flash memory, along with parameters and state indicators necessary to the execution of such methods. Although the above description focuses on a single controller 48 executing method 100 on the UPS 10, the instructions for executing method 100 may be distributed among a number of controllers in the UPS 10.

While the invention has been described with respect to certain embodiments, the description is intended to be exemplary, rather than limiting. Modifications and changes may be made within the scope of the invention, which is defined by the appended claims.

What is claimed is:

1. A method, comprising:
    determining an input power to a power supply, an output power from the power supply to a load, and a state of a second power source within or connected to the power supply;
    selecting between a first operating state, a second operating state, and a third operating state for the power supply based on said determining;
    delivering power to the load in the first operating state directly or indirectly from an AC power source connected to the power supply when the input power is greater than the output power and less than a predefined input power limit;
    delivering power to the load in the second operating state from the second power source when there is no input power to the power supply and the state of the second power source is such that the second power source is capable of providing power; and
    delivering power to the load in the third operating state from both the AC power supply and the second power source when the output power is greater than the predefined input power limit for the AC power source, said delivering power in the third operating state further comprising
        comparing the power delivered in the third operating state with a predefined supplemental power allocation for the load, and
        taking a predefined action with respect to the load when the power delivered in the third operating state meets the predefined supplemental power allocation for the load;
    wherein the predefined supplemental power allocation leaves a reserve in the second power source for use in the second operating state.

2. The method of claim 1, wherein the power supply comprises an uninterruptible power supply (UPS).

3. The method of claim 2, wherein the second power source comprises batteries.

4. The method of claim 3, wherein the batteries comprise lithium-ion batteries.

5. The method of claim 1, wherein the predefined action comprises shutting down the load when the power delivered in the third operating state meets the supplemental power allocation for the load.

6. A non-transitory machine-readable medium having machine-readable instructions encoded thereon that, when executed by a power supply, cause the power supply to:
    determine an input power to the power supply, an output power from the power supply to a load, and a state of a second power source within or connected to the power supply;
    select between a first operating state, a second operating state, and a third operating state for the power supply based on the input power, the output power, and the state of the second power source;
    deliver power to the load in the first operating state directly or indirectly from an AC power source connected to the power supply when the input power is greater than the output power and less than a predefined input power limit;
    deliver power to the load in the second operating state from the second power source when there is no input power to the power supply and the state of the second power source is such that the second power source is capable of providing power; and
    deliver power to the load in the third operating state from both the AC power supply and the second power source when the output power is greater than the predefined input power limit for the AC power source, including
        comparing the power delivered in the third operating state with a predefined supplemental power allocation for the load, and
        taking a predefined action with respect to the load when the power delivered in the third operating state meets the predefined supplemental power allocation for the load;
    wherein the predefined supplemental power allocation leaves a reserve in the second power source for use in the second operating state.

7. The non-transitory machine-readable medium of claim 6, wherein the power supply comprises an uninterruptible power supply (UPS).

8. The non-transitory machine-readable medium of claim 6, wherein the predefined action comprises shutting down the load when the power delivered in the third state meets the supplemental power allocation or allocations for the load.

9. The method of claim 1, wherein the predefined supplemental power allocation is specific to the load.

10. The non-transitory machine-readable medium of claim 6, wherein the predefined supplemental power allocation is specific to the load.

11. An uninterruptible power supply, comprising:
    a power bus operating with bus power in a specified condition;
    a power input adapted to be connected to an AC power source;
    a power input circuit connected between the power input and the power bus, the power input circuit adapted to receive AC power from the power input and convert the AC power to the specified condition of the bus power;
    a power output circuit adapted to convert the bus power from the specified condition into an output power form;
    a power output connected to the power output circuit and adapted to be connected to a load;
    a charge/discharge controller connected to the power bus;
    batteries connected to the charge/discharge controller so as to be charged by the bus through the charge/discharge controller and to be discharged to the bus through the charge/discharge controller; and
    a controller adapted to cause the uninterruptible power supply to
        determine an input power from the power input, an output power to the power output, and a state of the batteries;
        select between a first operating state, a second operating state, and a third operating state for the power supply based on the input power, the output power, and the state of the batteries;

deliver power in the first operating state from the power input when the input power is greater than the output power and less than a predefined input power limit;

deliver power in the second operating state from the batteries when there is no input power and the state of the batteries is such that the batteries are capable of providing power; and deliver power in the third operating state from both the power input and the batteries when the output power is greater than the predefined input power limit for the AC power source, including comparing the power delivered in the third operating state with a predefined supplemental power allocation for the load, and taking a predefined action with respect to the load when the power delivered in the third state meets the predefined supplemental power allocation for the load;

wherein the predefined supplemental power allocation for the load leaves a reserve of battery energy for use in the second operating state.

12. The uninterruptible power supply of claim 11, wherein the predefined action comprises shutting down the power output.

13. A method, comprising:

using an uninterruptible power supply (UPS) capable of supplying power from either or both of an AC power source and batteries, predefining in the UPS, for a load connected or connectable to the UPS, a maximum allowed input power and a maximum supplemental energy from the batteries, the maximum supplemental energy from the batteries being less than a full energy capacity of the batteries;

sensing an input power to the UPS and output power to the load;

selecting between a first operating state, a second operating state, and a third operating state for the UPS based on the input power to the UPS, the output power to the load, the maximum allowed input power, and the maximum supplemental energy from the batteries;

delivering power to the load in the first operating state from the AC power source while the output power to the load is less than the maximum allowed input power for the load;

delivering power to the load in the second operating state from both the AC power source and the batteries when the output power to the load is greater than the maximum allowed input power for the load until the maximum supplemental energy from the batteries has been expended;

taking a predefined action with respect to the load when the maximum supplemental energy from the batteries in the second operating state has been expended; and delivering power to the load in the third operating state solely from the batteries when there is no input power to the UPS;

wherein the maximum supplemental energy from the batteries leaves a reserve of battery energy for use in the third operating state.

14. The method of claim 13, the predefined action in the second operating state comprising powering down the load when the maximum supplemental energy from the batteries has been expended.

15. The method of claim 14, further comprising, after the maximum supplemental energy from the batteries has been expended, reapplying power to the load according to predefined conditions.

16. The method of claim 15, wherein the predefined conditions comprise when the batteries are full.

17. The method of claim 15, wherein the predefined conditions comprise when the batteries are at a predefined percentage of full charge.

18. The method of claim 15, wherein the predefined conditions comprise when a firmware or hardware "on" command is issued.

* * * * *